United States Patent
Narikawa et al.

(10) Patent No.: US 10,148,921 B2
(45) Date of Patent: Dec. 4, 2018

(54) PROJECTION DEVICE, PROJECTION CONTROL METHOD AND STORAGE MEDIUM

(71) Applicant: CASIO COMPUTER CO., LTD., Shibuya-ku (JP)

(72) Inventors: Tetsuro Narikawa, Hamura (JP); Akihide Takasu, Akishima (JP); Yoshihiko Shinozaki, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/047,285

(22) Filed: Feb. 18, 2016

(65) Prior Publication Data
US 2016/0269697 A1    Sep. 15, 2016

(30) Foreign Application Priority Data
Mar. 11, 2015  (JP) .................................. 2015-048597

(51) Int. Cl.
*H04N 5/70* (2006.01)
*H04N 9/31* (2006.01)

(52) U.S. Cl.
CPC ......... *H04N 9/3164* (2013.01); *H04N 9/3155* (2013.01); *H04N 9/3158* (2013.01)

(58) Field of Classification Search
CPC .......................... G03B 21/0253; H04N 9/3155
USPC .............................. 345/102; 348/744; 353/85
See application file for complete search history.

(56) References Cited

U.S. PATENT DOCUMENTS

| 2002/0063670 | A1* | 5/2002 | Yoshinaga | G09G 3/3413 345/87 |
| 2003/0174262 | A1* | 9/2003 | Sugawara | G09G 3/342 349/65 |
| 2003/0179221 | A1* | 9/2003 | Nitta | G09G 3/3406 345/690 |
| 2006/0082529 | A1* | 4/2006 | Oyama | G09G 3/3406 345/82 |
| 2006/0221021 | A1* | 10/2006 | Hajjar | G03B 21/567 345/84 |

(Continued)

FOREIGN PATENT DOCUMENTS

JP  2006-140647  6/2006
JP  2007-334092  12/2007

(Continued)

OTHER PUBLICATIONS

Office Action dated Apr. 4, 2017 which issued in the corresponding Japanese Patent Application No. 2015-048597.

*Primary Examiner* — Jefferey F Harold
*Assistant Examiner* — Humam M Satti
(74) *Attorney, Agent, or Firm* — Cozen O'Connor (57) ABSTRACT

A projection device includes a light source with a plurality of emission light colors, a projection unit configured to form and project a light image corresponding to a given video signal, by using light from the light source, and a controller configured to lower, when video that is projected by the projection unit becomes all black on an entire screen, a brightness of the light source to a light emission state of a predetermined brightness with respect to each of the emission light colors, and to turn off the light source after each of lights of all of the plurality of emission light colors has reached the light emission state of the predetermined brightness.

19 Claims, 5 Drawing Sheets

(56) References Cited

U.S. PATENT DOCUMENTS

| | | | |
|---|---|---|---|
| 2007/0229447 A1* | 10/2007 | Takahara | G09G 3/3406 345/102 |
| 2008/0001881 A1* | 1/2008 | Baba | G09G 3/3406 345/89 |
| 2008/0198117 A1* | 8/2008 | Kumakura | G09G 3/3648 345/89 |
| 2009/0146941 A1* | 6/2009 | Fujine | G09G 3/3406 345/102 |
| 2009/0174636 A1* | 7/2009 | Kohashikawa | G09G 3/3406 345/87 |
| 2011/0249035 A1* | 10/2011 | Arai | G02F 1/133604 345/690 |
| 2012/0256908 A1* | 10/2012 | Lee | G09G 3/003 345/419 |
| 2013/0070208 A1 | 3/2013 | Nakanishi | |

FOREIGN PATENT DOCUMENTS

| | | |
|---|---|---|
| JP | 2008-176024 | 7/2008 |
| JP | 2009-265120 | 11/2009 |
| WO | WO 2010/073792 | 7/2010 |
| WO | WO 2011/148507 | 12/2011 |

\* cited by examiner

PROJECTION DEVICE, PROJECTION CONTROL METHOD AND STORAGE MEDIUM

CROSS-REFERENCE TO RELATED APPLICATIONS

This application is based upon and claims the benefit of priority from Japanese Patent Application No. 2015-048597, filed Mar. 11, 2015, the entire contents of which are incorporated herein by reference.

BACKGROUND OF THE INVENTION

1. Field of the Invention

The present invention relates to a projection device, a projection control method, and a storage medium.

2. Description of the Related Art

In Jpn. Pat. Appln. KOKAI Publication No. 2009-265120, there is proposed a technique for providing a projection-type display device which can realize a high contrast in a display screen. In this technique, two light modulation elements are provided on a projection optical path, and a product of the contrasts of these two light modulation elements is set as a synthetic contrast.

There have been proposed various techniques including the technique disclosed in Jpn. Pat. Appln. KOKAI Publication No. 2009-265120, which aim at realizing a high contrast by adopting a complex configuration, for example, by using a diaphragm mechanism or a shutter mechanism, and two light modulation element mechanisms, on an optical path of a projection system.

In the meantime, in recent years, a projector device has been commercialized, which employs a semiconductor light-emitting element, such as a light-emitting diode (LED) or a semiconductor laser (LD), as a light source.

In the projector device using this kind of semiconductor light-emitting element as the light source, the element itself of the light source is temporarily turned off in synchronism with a video timing when the entire screen becomes all black during a projection operation. Thereby, the occurrence of so-called "black-floating" due to leak light, etc. in the display element is avoided, and a much higher contrast can be obtained.

When the elements of the light source were turned off at the same time in synchronism with a video timing when the entire screen becomes all black, as described above, completely black video appears instantaneously in a projected image from the state in which the light source had been turned on, and there may be a case in which a user feels an abrupt change and some unnaturalness as an expression of projected video.

Thus, when video images in which the entire screen is all black continue, such a driving method is thinkable that the emission brightnesses of the elements of the light source are gradually lowered by setting a fixed time width of, for example, about one second.

However, for example, when three kinds of LEDs (light-emitting diodes) with emission light colors of R (red), G (green) and B (blue) are used as the semiconductor light-emitting elements that are used for the light source, the light emission physical characteristics, such as forward-directional drop voltages, vary from color to color, to be exact, from element to element of LEDs to be used. It is thus difficult to turn off the LEDs of all colors exactly at the same time, during the process of gradually lowering the emission brightnesses of the respective colors.

As a result, the emission light color of an LED, the turn-off of which was delayed, is perceived by the user as a single primary color or a complementary color due to color mixture, and the emission light color is recognized as an unnatural projection image immediately before the entire screen becomes all black.

Accordingly, it is an object of the invention to provide a projection device which makes possible a more natural, smooth transition to video in which an entire screen is all black, a projection control method and a program.

BRIEF SUMMARY OF THE INVENTION

According to one aspect of the present invention, a projection device includes a light source with a plurality of emission light colors, a projection unit configured to form and project a light image corresponding to a given video signal, by using light from the light source, and a controller configured to lower, when video that is projected by the projection unit becomes all black on an entire screen, a brightness of the light source to a light emission state of a predetermined brightness with respect to each of the emission light colors, and to turn off the light source after each of lights of all of the plurality of emission light colors has reached the light emission state of the predetermined brightness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, referring to the accompanying drawings, a detailed description will be given of an embodiment in a case in which the present invention is applied to a projector device of a digital light processing (DLP)® method.

Figure 1:
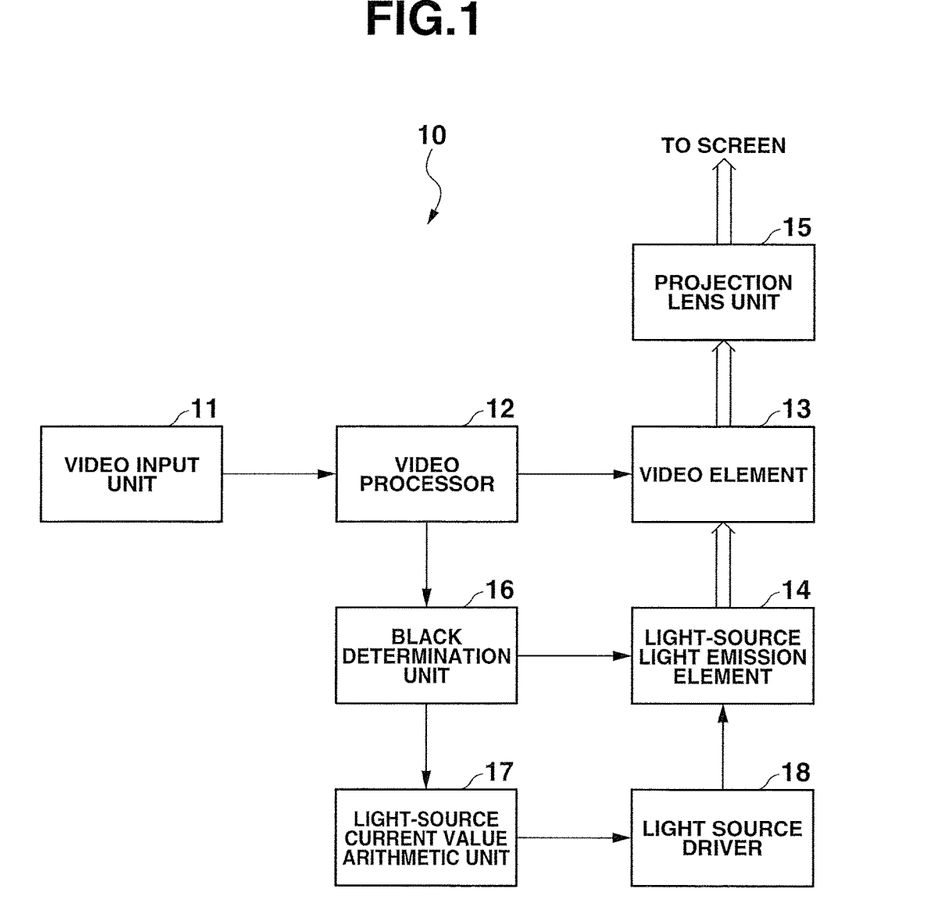
FIG. 1 is a block diagram illustrating a functional configuration of a projector device according to an embodiment of the present invention.

FIG. 1 is a block diagram illustrating a configuration of a functional circuit of a projector device 10 according to the embodiment. In FIG. 1, various video signals from an external device, for instance, a personal computer (not shown) or an information device such as a smartphone having a video playback function, are input from a video input unit 11.

If the input video signal is an analog signal, the video input unit 11 converts the analog signal to digital data, where necessary, and then outputs the digital data to a video processor 12.

The video processor 12 converts given video data in accordance with a format such as a preset image size, frame rate and pixel-by-pixel quantization bit number, and furthermore superimposes, where necessary, video of OSD information such as menu items, and then the video processor 12 drives a video element 13 to effect display, based on the processed video data.

The video element 13 is composed of a micro-mirror element and a driver circuit for driving the micro-mirror. The micro-mirror element is configured such that very small movable mirrors, the number of which is equal to the number of pixels of, e.g., WXGA (1280 dots×800 dots), are arranged in a matrix. The video element 13 executes a display operation which corresponds to the display driving of the video processor 12.

Light of a primary color or a complementary color is radiated from a light-source light emission element 14 to the video element 13 in a time-division manner. The light-source light emission element 14 includes a light-emitting diode (LED) and a semiconductor laser (LD), which are semiconductor light-emitting elements. The light-source light emission element 14 radiates primary-color light to the video element 13 cyclically in a time-division manner by singly emitting R (red) light, G (green) light or B (blue) light of a primary color. The light source 14 radiates complementary-color light as compound-color light to the video element 13 cyclically in a time-division manner by simultaneously emitting lights of two colors or three colors.

In the meantime, the light-source light emission element 14 is not limited to such a configuration as to emit direct light from the semiconductor light-emitting element to the video element 13. For example, such a configuration is thinkable that B light, which is emitted by the LD, is radiated on a rotary phosphor within the light-source light emission element 14, and G light, which is obtained as transmissive light or reflective light of the radiated B light, is emitted to the video element 13.

A light image is formed by reflective light at the video element 13, and the formed light image is enlarged by a projection lens unit 15 and radiated toward a screen (not shown) or the like, which is a projection target.

The video processor 12 also outputs the video data to a black determination unit 16. The black determination unit 16 determines, from this video data, whether the entire screen becomes all black or not, on a frame-by-frame basis, and sends the determination result to a light-source current value arithmetic unit 17.

The light-source current value arithmetic unit 17 calculates a driving current value of each of the semiconductor light-emitting elements which constitute the light-source light emission element 14, in accordance with the determination result in the black determination unit 16, and outputs the calculation result to a light source driver 18.

The light source driver 18 supplies a necessary driving current to each semiconductor light-emitting element of the light-source light emission element 14. In particular, in a projection state in which the entire screen becomes all black, the driving current, which is supplied to the light-source light emission element 14, is controlled based on the calculation result in the light source driver 18.

Next, the operation of the above-described embodiment is described.

Figure 2:
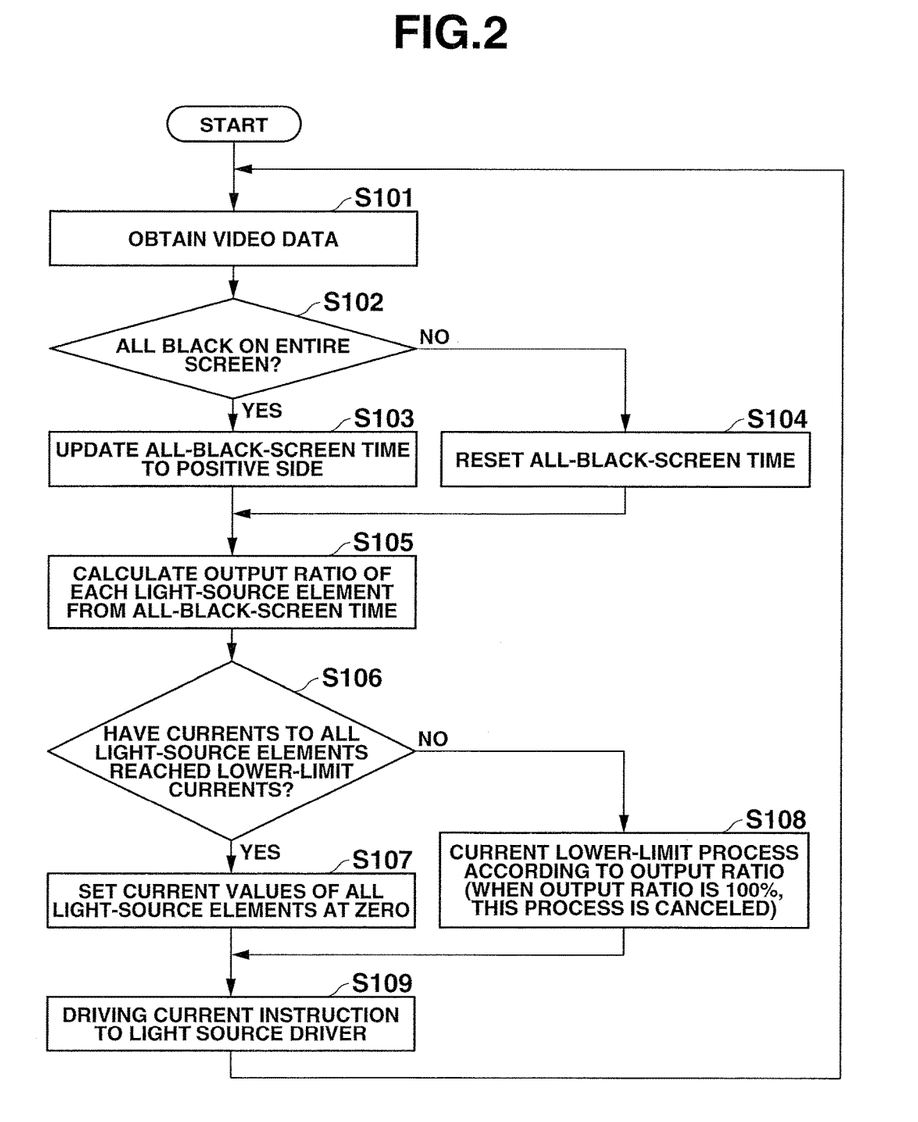
FIG. 2 is a flowchart illustrating the contents of a process of light amount control, which is executed in parallel with video display according to the embodiment.

FIG. 2 is a flowchart illustrating a series of process contents of light amount control in the light-source light emission element 14, which are executed in units of one video frame by the black determination unit 16, light-source current value arithmetic unit 17 and light source driver 18 in parallel with video display in the video element 13 by the video processor 12.

In the process, to start with, the black determination unit 16 obtains video data of one frame from the video processor 12 (step S101), and determines, from the content of the video data, whether the video data is such video that the entire screen becomes all black (step S102).

Here, if it is determined that the video data is not such video that the entire screen becomes all black, but that video which requires brightness is projected on at least a part of the screen, the light-source current value arithmetic unit 17 resets to "0" the duration of the projection state in which the entire screen becomes all black, based on this determination result (step S104).

On the other hand, if it is determined in step S102 that the video data is such video that the entire screen becomes all black, the light-source current value arithmetic unit 17 updates to a positive side the duration of the projection state in which the entire screen becomes all black, this duration having been counted so far (step S103).

After the process of step S103 or S104, the light-source current value arithmetic unit 17 calculates the output ratios of the semiconductor light-emitting elements of the respective colors which constitute the light-source light emission element 14, from the duration of the projection state in which the entire screen is all black, which has been counted at the time point (step S105).

Here, the output ratio (%) is given by the following equation:

$$\text{Output ratio} = 100\% - Tbk \times \alpha \qquad (1)$$

(where Tbk: time (msec) in which the entire screen is all black, α: predetermined coefficient)

When the duration of the projection state, in which the entire screen is all black, was reset to 0 (zero) in step S104, the second term of the right side of the above equation (1) becomes 0 (zero), and thus the output ratio becomes 100%.

After the calculation of the output ratio, the light-source current value arithmetic unit 17 determines whether the output ratios of the light-emitting elements of all colors have reached values corresponding to minimum currents which keep light emission (step S106).

Here, if it is determined that at least one of the output ratios of the light-emitting elements of all colors fails to reach the value corresponding to the minimum current which keeps light emission (No in step S106), the light-source current value arithmetic unit 17 executes a current lower-limit process which keeps the output ratio of the light-emitting element of a color, which has reached the value corresponding to the minimum current which keeps light emission, while lowering and setting the driving currents with respect to the other colors in accordance with the output ratios at the time point (step S108). The light-source current value arithmetic unit 17 causes the light source driver 18 to drive the light-source light emission element 14 in accordance with the set current value of each color (step S109), and returns to the process from step S101.

In the meantime, if the output ratio calculated in the immediately preceding step S105 is 100%, the light-source current value arithmetic unit 17 cancels the current lower-limit process in the above step S108, sets the output ratios of the light-emitting elements of all colors at 100% of the rated current of the projection mode that is set at the time point, and then causes the light source driver 18 to drive the light-source light emission element 14 in the subsequent step S109.

In addition, in the above step S106, if it is determined that the output ratios of the light-emitting elements of all colors have reached the values corresponding to the minimum currents which keep light emission (Yes in step S106), the light-source current value arithmetic unit 17 sets the driving currents to the light-emitting elements of all colors at "0" (step S107), turns off the light-source light emission element 14 (step S109), and returns to the process from step S101.

Figure 3A:
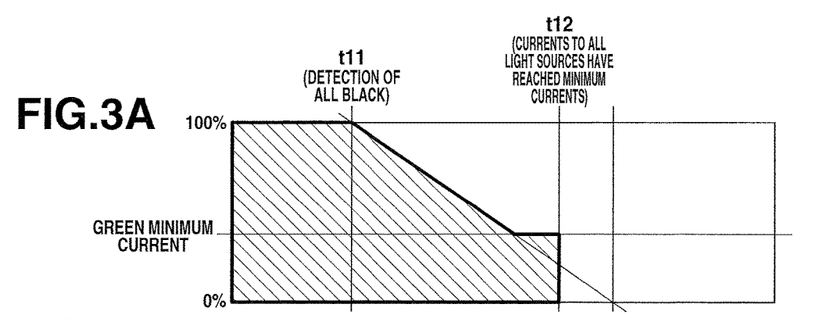
FIG. 3A, FIG. 3B and FIG. 3C are views for explaining the concept of control on light-source light-emitting elements according to the embodiment.
Figure 3B:
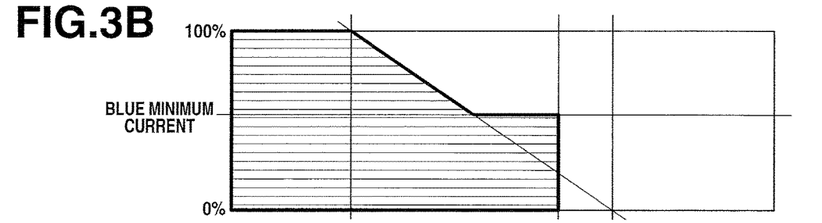
Figure 3C:
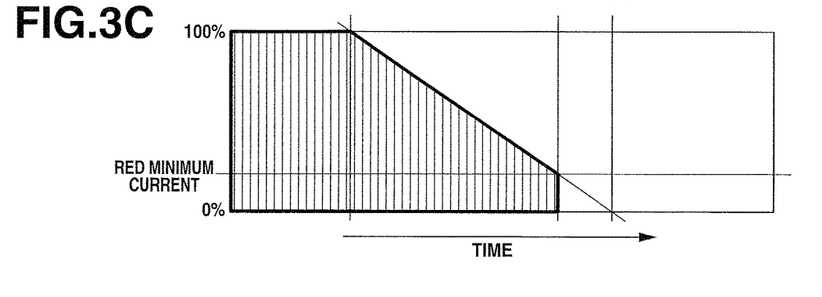

FIG. 3A, FIG. 3B and FIG. 3C are views for explaining the concept of the above-described control in FIG. 2, in the case where the semiconductor light-emitting elements, which constitute the light-source light emission element 14, are composed of, for example, three kinds which emit R light G light and B light.

At a time of normal video projection in which the entire screen is not all black, the process of the above steps S101, S102, S104, S105, S106, S108 and S109 is repeated, and the semiconductor light-emitting elements of the respective colors of R, G and B are driven to emit light in the state in which the driving currents to the semiconductor light-emitting elements are kept at 100% as rated currents.

Then, as indicated by a timing t11 in FIG. 3A, FIG. 3B and FIG. 3C, from the time point when the black determination unit 16 has determined that the entire screen has become all black, the process of the above steps S101, S102, S103, S105, S106, S108 and S109 is repeated, and the above-described output ratios are gradually lowered in accordance with the elapsed time from the timing t11. Thus, while the ratio between the driving currents of the respective colors is being maintained, the driving currents to the semiconductor light-emitting elements of the respective colors of R, G and B are gradually decreased, thereby lowering the brightness while keeping the color balance as a whole.

Thereafter, for example, as illustrated in FIG. 3B, at a time point when the current to the semiconductor light-emitting element of B light has decreased to the minimum current which keeps light emission, the light-source current value arithmetic unit 17 executes such setting as to keep this minimum current for this semiconductor light-emitting element.

Further, as illustrated in FIG. 3A, at a time point when the current to the semiconductor light-emitting element of G light has also decreased to the minimum current which keeps light emission, the light-source current value arithmetic unit 17 executes such setting as to keep this minimum current for this semiconductor light-emitting element.

Then, as illustrated in FIG. 3C, at a timing t12 when the current to the semiconductor light-emitting element of R light has also decreased to the minimum current which keeps light emission, if it is determined in the above step S106 that the output ratios of the light-emitting elements of all colors have reached values corresponding to minimum currents which keep light emission, the light-source current value arithmetic unit 17 sets, in subsequent step S107, the driving currents to the light-emitting elements of all colors at "0", and turns off the entirety of the light-source light emission element 14, and returns to the process of step S101.

Thereafter, while the video data from the video input unit 11 is still video data in which the entire screen becomes all black, the process of steps S101, S102, S103, S105, S106, S107 and S109 is repeatedly executed, and the projection state in which the light-source light emission element 14 is turned off is maintained.

Subsequently, if the video data from the video input unit 11 restores to video data at a normal video projection time, in which the entire screen is not all black, this is determined in step S102, and then the process of steps S101, S102, S104, S105, S106, S108 and S109 is repeatedly executed, and the driving currents to the semiconductor light-emitting elements of the respective colors of R, G and B are restored to the driving currents for light emission, which are kept at 100% as rated.

Incidentally, when the projector device 10 is a so-called three-plate-type projector device which employs three independent video elements 13 for R, G and B and projects primary-color images in parallel at the same time, the driving control method of FIG. 3A, FIG. 3B and FIG. 3C is applicable as such.

Figure 4A:
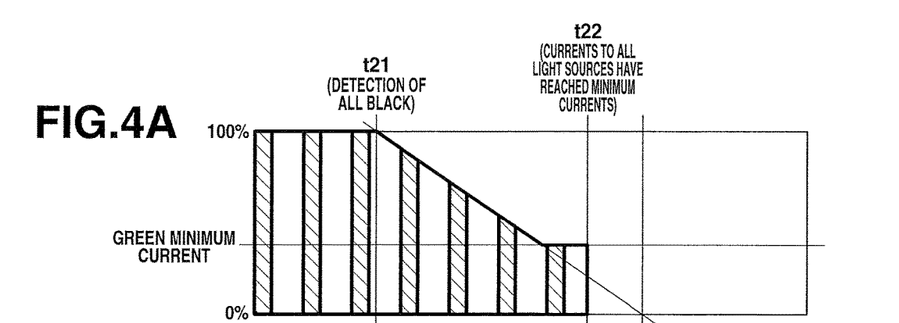
FIG. 4A, FIG. 4B and FIG. 4C are views illustrating transition states of driving currents in a case of driving semiconductor light-emitting elements according to the embodiment in a time-division manner.
Figure 4B:
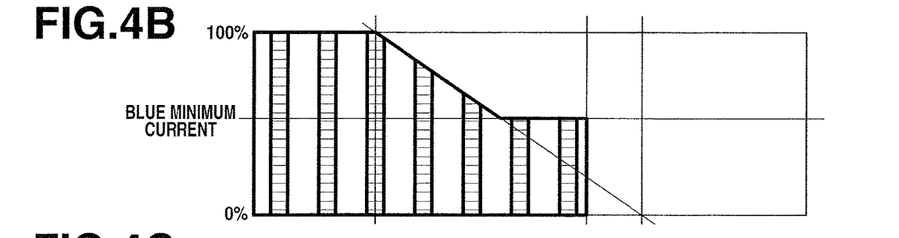
Figure 4C:
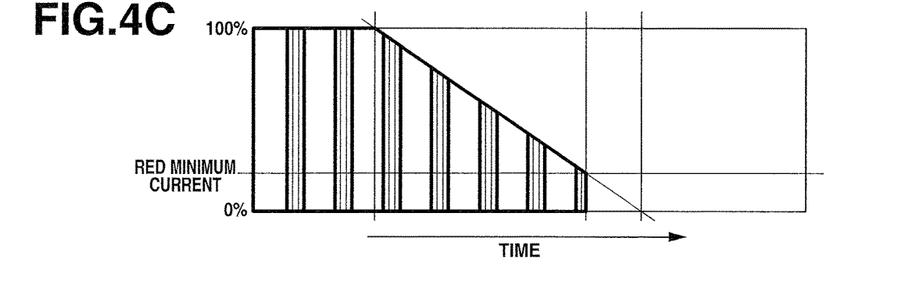

However, the actual driving timing of the light-source light emission element 14 becomes as illustrated in FIG. 4A, FIG. 4B and FIG. 4C, in the case of performing time-division driving by a so-called single-plate-type projector wherein the video element 13 is composed of a single micro-mirror element and a driving circuit thereof and light images of the respective colors are formed in a time-division manner by radiating, for example, primary-color lights of R, G and B (and complementary-color lights) from the light-source light emission element 14 in a time-division manner.

FIG. 4A, FIG. 4B and FIG. 4C illustrate transition states of driving currents at a time when the entire screen becomes all black, in the case of driving the semiconductor light-emitting elements of the respective colors of the light-source light emission element 14 in a time-division manner, with one frame cycle being set in the order of G light, B light and R light.

In FIG. 4A, FIG. 4B and FIG. 4C, it is determined that the entire screen has become all black, from a timing t21 when the light-source light emission element 14 is being driven to emit B light, and the above-described output ratios are gradually lowered. While the ratio between the driving currents of the respective colors is being maintained, the driving currents to the semiconductor light-emitting elements of the respective colors of R, G and B are gradually decreased, thereby lowering the emission light amount while keeping the color balance.

Thereafter, for example, as illustrated in FIG. 4B, at a time point when the current to the semiconductor light-emitting element of B light has decreased to the minimum current which keeps light emission, this minimum current is maintained. Further, as illustrated in FIG. 4A, at a time point when the current to the semiconductor light-emitting element of G light has also decreased to the minimum current which keeps light emission, this minimum current is maintained.

Then, as illustrated in FIG. 4C, at a timing t22 when the current to the semiconductor light-emitting element of R light has decreased to the minimum current which keeps light emission, if it is determined that the output ratios of the light-emitting elements of all colors have reached values corresponding to the minimum currents, the light-source current value arithmetic unit 17 sets the driving currents to the light-emitting elements of all colors at "0", and turns off the entirety of the light-source light emission element 14.

In this case, the color balance of one video frame is maintained with one cycle being composed of a G field, a B field and an R field, and the driving characteristics of the respective light-emitting elements are different from those described above. For example, assume a case in which the current to the light-emitting diode of the R color has first decreased to the minimum current for maintaining light emission in the R field of an "n−1" frame, and then the current to the light-emitting diode of the G color has decreased to the minimum current for maintaining light emission in the G field of a subsequent "n" frame and the current to the light-emitting diode of the B color has decreased to the minimum current for maintaining light emission in the B field of the "n" frame. In this case, in order to maintain the color balance in this frame, the light emission with the minimum current may be maintained in the R field at the last of the frame, and, at a timing of the start of a subsequent "n+1" frame, the driving currents to the light-emission elements of all colors may be set at "0".

Figure 5A:
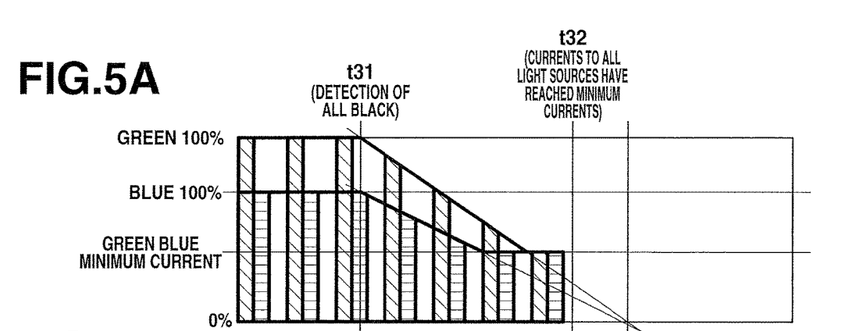
FIG. 5A and FIG. 5B are views illustrating transition states of driving currents in the case of driving the semiconductor light-emitting elements according to the embodiment in a time-division manner.
Figure 5B:
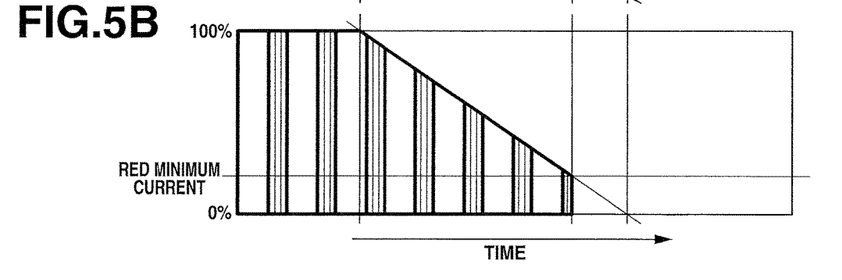

A description will also be given of an example of driving in the case of using, in the light-source light emission element 14, direct light which is emitted by a single-color semiconductor light-emitting element, and indirect light which is frequency-converted via a phosphor.

FIG. 5A and FIG. 5B are views illustrating transition states of driving currents at a time when the entire screen becomes all black in the case of driving the semiconductor light-emitting elements of the respective colors of the light-source light-emission element 14 in a time-division manner. In this case, it is assumed that one frame cycle is set in the order of G light, B light and R light, and G light is taken out as reflective light which is obtained by radiating, on a phosphor, light from the semiconductor light-emitting element which emits B light that is direct light.

In this case, even with the identical semiconductor light-emitting element, the driving current at the output ratio of 100% differs, in terms of light emission efficiency, between the case of emitting G light that is indirect light, and the case of emitting B light that is direct light. A higher current is needed when G light is emitted. However, the minimum current for maintaining minimum light emission is common between both cases.

In FIG. 5A and FIG. 5B, from a timing t31 when the light-source light emission element 14 is being driven to emit B light, it is determined that the entire screen has become all black, and the above-described output ratios are gradually lowered. While the ratio between the driving currents of the respective colors is being maintained, the driving currents to the semiconductor light-emitting elements of the respective colors of R, G and B are gradually decreased, thereby lowering the emission light amount while keeping the color balance.

Thereafter, for example, as illustrated in FIG. 5A, at a time point when the current to the semiconductor light-emitting element of B light has decreased to the minimum current for keeping light emission, this minimum current is maintained. Further, as illustrated in FIG. 5A, at a time point when the current to the semiconductor light-emitting element of G light has also decreased to the minimum current for keeping light emission, this minimum current is maintained.

Then, as illustrated in FIG. 5B, at a timing t32 when the current to the semiconductor light-emitting element of R light has decreased to the minimum current for keeping light emission, if it is determined that the output ratios of the light-emitting elements of all colors have reached values corresponding to the minimum currents, the light-source current value arithmetic unit 17 sets the driving currents to the light-emitting elements of all colors at "0", and turns off the entirety of the light-source light emission element 14.

In the meantime, the light-source light emission element 14 may be configured not only to emit the above-described primary-color lights R, G and B by single colors, but also to simultaneously drive light-emitting elements of plural colors and to emit lights of complementary colors by the color mixture of the plural colors. The kinds of emission light colors, the order of colors, etc. are not restricted.

As has been described above in detail, according to the present embodiment, a more natural, smooth transition is made possible to video in which an entire screen is all black.

In addition, in the above-described embodiment, since the light source is turned off in synchronism with the driving cycle of the plural semiconductor light-emitting elements which are driven in a time-division manner, a more natural, smooth transition is made possible to video in which an entire screen is all black, without losing a color balance in units of a frame.

In the meantime, in the above-embodiment, for the purpose of simple description, it is assumed that the driving current value linearly varies from the state of 100% of the output ratio to the minimum current, as illustrated in FIG. 3A, FIG. 3B, FIG. 3C, FIG. 4A, FIG. 4B, FIG. 4C, FIG. 5A and FIG. 5B, on the presupposition that the driving current is proportional to the emission light amount. However, in consideration of the characteristics due to the kinds (structures) of elements to be used or the characteristics depending on the variances among the individual elements, the variation characteristics of the driving current values may be preset in a manner to vary in various curbs, based on the characteristics between the driving currents and the emission light amounts.

By making the above settings, the light amount control, which corresponds to each individual semiconductor light-emitting element of each color, can be realized in the state in which the color balance with the other light-emitting elements is maintained.

In the meantime, when video that is to be projected by the projection means becomes all black on the entire screen, the control means lowers the brightness of the light source to a light emission state of predetermined brightness with respect to each of the emission light colors, and turns off the light source at a time point when each of the lights of all colors has reached the light emission state of the predetermined brightness. However, the timing when the light source is turned off is not limited to the time point when each of the lights of all colors has reached the light emission state of predetermined brightness. Specifically, the light source may be turned off at any time after each of the lights of all colors has reached the light emission state of predetermined brightness.

The present invention is not limited to the above-described embodiment. In practice, various modifications may be made without departing from the spirit of the invention. In addition, the functions executed in the embodiment may be implemented by being properly combined as much as possible. The above-described embodiments include inventions in various stages, and various inventions can be derived from proper combinations of structural elements disclosed herein. For example, even if some structural elements in all the structural elements disclosed in the embodiment are omitted, if the advantageous effect can be obtained, the structure without such structural elements can be derived as an invention.

What is claimed is:

1. A projection device comprising:
   a light source with a plurality of emission light colors;
   a projection unit configured to form and project a light image corresponding to a given video signal, by using light from the light source; and
   a controller configured to:
   lower, when video that is projected by the projection unit becomes all black on an entire screen, a current value of the light source for each of said plurality of emission light colors until each one reaches a light emission state according to a nearly minimum current value to maintain the emission state of the light source;
   keep a current value of the light source for whichever one of the emission light colors has reached the nearly minimum current value until all of the emission light colors reach light emission states according to respective nearly minimum current values; and
   turn off the light source for all of the plurality of emission light colors after all of the plurality of emission light colors have reached the light emission states according to the respective nearly minimum current values.

2. The projection device according to claim 1, wherein the light source is configured to execute time-division driving with respect to the plurality of emission light colors, and
   the controller is configured to turn off the light source in synchronism with a driving cycle of the plurality of emission light colors by the time-division driving.

3. The projection device according to claim 1, wherein the controller is configured to individually set driving conditions until entering a light emission state of a minimum brightness, in accordance with light emission characteristics of the respective emission light colors of the light source.

4. The projection device according to claim 2, wherein the controller is configured to individually set driving conditions until entering a light emission state of a minimum brightness, in accordance with light emission characteristics of the respective emission light colors of the light source.

5. The projection device according to claim 1, wherein the light source comprises semiconductor light-emitting elements of a plurality of emission light colors.

6. The projection device according to claim 2, wherein the light source comprises semiconductor light-emitting elements of a plurality of emission light colors.

7. The projection device according to claim 3, wherein the light source comprises semiconductor light-emitting elements of a plurality of emission light colors.

8. The projection device according to claim 4, wherein the light source comprises semiconductor light-emitting elements of a plurality of emission light colors.

9. The projection device according to claim 1, wherein the controller is configured to lower the brightness of the light source until entering the light emission state of the predetermined brightness, while maintaining a balance of colors as a whole.

10. The projection device according to claim 2, wherein the controller is configured to lower the brightness of the light source until entering the light emission state of the predetermined brightness, while maintaining a balance of colors as a whole.

11. The projection device according to claim 3, wherein the controller is configured to lower the brightness of the light source until entering the light emission state of the predetermined brightness, while maintaining a balance of colors as a whole.

12. The projection device according to claim 4, wherein the controller is configured to lower the brightness of the light source until entering the light emission state of the predetermined brightness, while maintaining a balance of colors as a whole.

13. The projection device according to claim 5, wherein the controller is configured to lower the brightness of the light source until entering the light emission state of the predetermined brightness, while maintaining a balance of colors as a whole.

14. The projection device according to claim 6, wherein the controller is configured to lower the brightness of the light source until entering the light emission state of the predetermined brightness, while maintaining a balance of colors as a whole.

15. The projection device according to claim 7, wherein the controller is configured to lower the brightness of the light source until entering the light emission state of the predetermined brightness, while maintaining a balance of colors as a whole.

16. The projection device according to claim 8, wherein the controller is configured to lower the brightness of the light source until entering the light emission state of the predetermined brightness, while maintaining a balance of colors as a whole.

17. The projection device according to claim 1, wherein the predetermined brightness is a minimum brightness of each of the emission light colors of the light source.

18. A projection control method applied to a device including a light source with a plurality of emission light colors, and a projection unit configured to form and project a light image corresponding to a given video signal, by using light from the light source, the projection control method comprising:
    lowering, when video that is projected by the projection unit becomes all black on an entire screen, a current value of the light source for each of said plurality of emission light colors until each one reaches a light emission state according to a nearly minimum current value to maintain the emission state of the light source;
    keeping a current value of the light source for whichever one of the emission light colors has reached the nearly minimum current value until all of the emission light colors reach light emission states according to respective nearly minimum current values; and
    turning off the light source for all of the plurality of emission light colors after all of the plurality of emission light colors have reached the light emission states according to the respective nearly minimum current values.

19. A non-transitory computer readable storage medium having stored therein a program which is executed by a computer, which is incorporated in a device including a light source with a plurality of emission light colors, and a projection unit configured to form and project a light image corresponding to a given video signal, by using light from the light source, the program causing the computer to perform functions comprising:
    lowering, when video that is projected by the projection unit becomes all black on an entire screen, a current value of the light source for each of said plurality of emission light colors until each one reaches a light emission state according to a nearly minimum current value to maintain the emission state of the light source;

keeping a current value of the light source for whichever one of the emission light colors has reached the nearly minimum current value until all of the emission light colors reach light emission states according to respective nearly minimum current values; and turning off the light source for all of the plurality of emission light colors after all of the plurality of emission light colors have reached the light emission states according to the respective nearly minimum current values.

* * * * *